United States Patent [19]

Woodman

[11] Patent Number: 4,626,650

[45] Date of Patent: Dec. 2, 1986

[54] TWO-AXIS CUTTING MACHINE USING A PLASMA ARC TORCH OR THE LIKE

[75] Inventor: Edward C. Woodman, Newburyport, Mass.

[73] Assignee: Cybermation, Inc., Cambridge, Mass.

[21] Appl. No.: 621,110

[22] Filed: Jun. 15, 1984

[51] Int. Cl.[4] ............................................. B23K 15/00
[52] U.S. Cl. ...................... 219/121 PX; 219/121 PC; 219/121 P; 260/67; 260/69; 260/73
[58] Field of Search ...... 219/121 PC, 121 P, 121 PX, 219/121 PU, 158–161; 266/67, 69, 72, 73, 58; 83/71

[56] References Cited

U.S. PATENT DOCUMENTS

| | | | |
|---|---|---|---|
| 2,860,872 | 11/1958 | Doeg | 268/59 |
| 3,396,402 | 8/1968 | De Mey, II | 346/29 |
| 3,422,537 | 1/1969 | Dewey et al. | 33/18 |
| 3,529,481 | 9/1970 | Budzyn | 74/89.21 |
| 3,717,332 | 2/1973 | Luker et al. | 266/23 B |
| 3,810,414 | 5/1974 | Gerber | 90/11 C |
| 3,872,960 | 3/1975 | Gabor | 197/53 |
| 3,881,369 | 5/1975 | Looney | 74/89.2 |
| 4,007,544 | 2/1977 | Kirby et al. | 33/174 R |
| 4,121,808 | 10/1978 | Cardea | 266/69 |
| 4,176,455 | 12/1979 | Copeland et al. | 33/1 M |
| 4,325,188 | 4/1982 | Reinmold et al. | 33/1 M |
| 4,327,596 | 5/1982 | Simon | 74/89.2 |
| 4,346,867 | 8/1982 | Dick et al. | 248/424 |
| 4,368,647 | 1/1983 | Sakaguchi | 74/89.22 |
| 4,386,470 | 6/1983 | Perry | 33/438 |
| 4,419,823 | 12/1983 | Thorban | 33/1 M |
| 4,420,886 | 12/1983 | Amano | 33/1 M |
| 4,466,069 | 8/1984 | Balfanz | 266/69 |

*Primary Examiner*—M. H. Paschall

[57] ABSTRACT

A two-axis cutting machine for cutting a workpiece along a desired cutting path, has a frame for holding the workpiece, a rail fixed to the frame, a beam arranged to move along the rail and having a pair of driving points spaced apart along the axis of the beam, a cutting tool arranged to move along an axis of the beam, an elongated flexible drive means having portions engaged respectively at the two driving points, a carrier mechanism for carrying a drive section of the drive means, and for translating a force applied on the drive section into a pair of resulting forces directed parallel to the rail and applied respectively at the two driving points, and a beam drive motor mounted on the beam for exerting a force on the drive member, whereby the resulting forces move the beam along the rail, while maintaining a constant angle between the beam axis and the rail.

14 Claims, 2 Drawing Figures

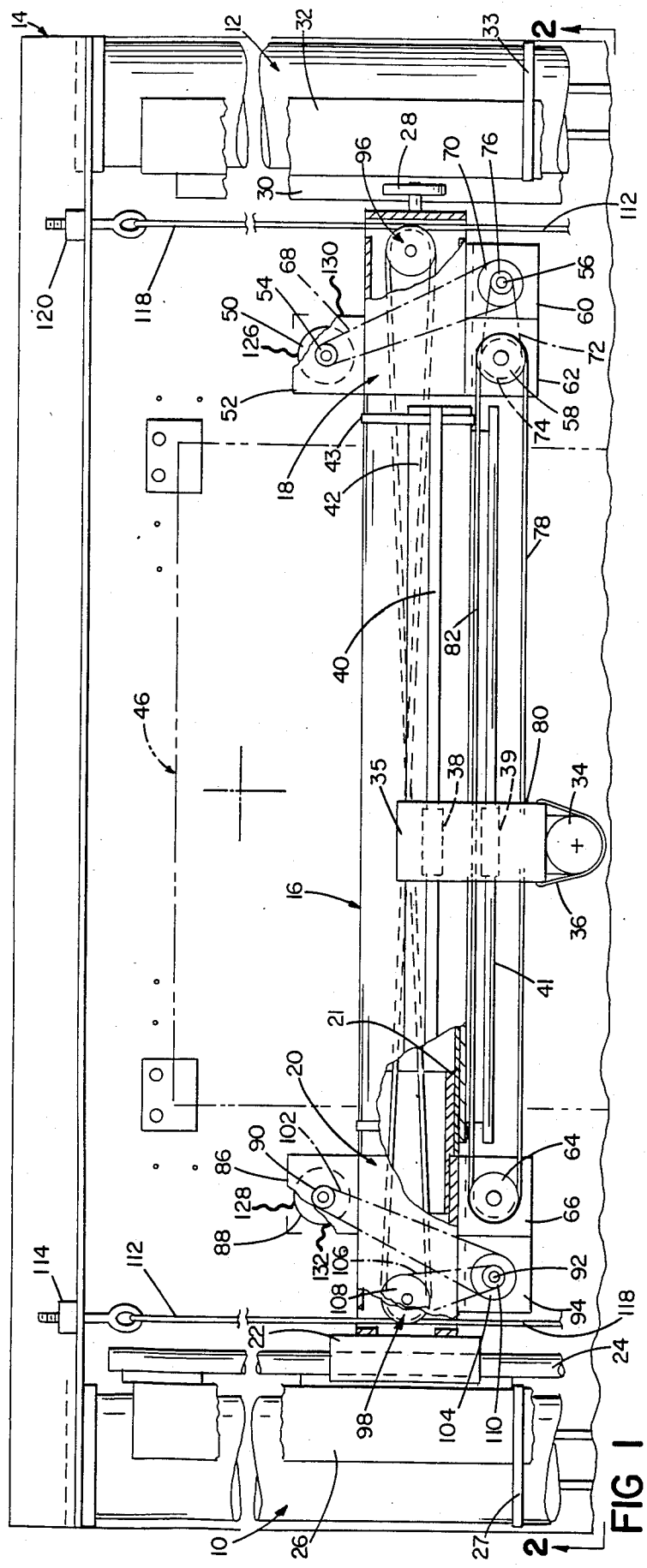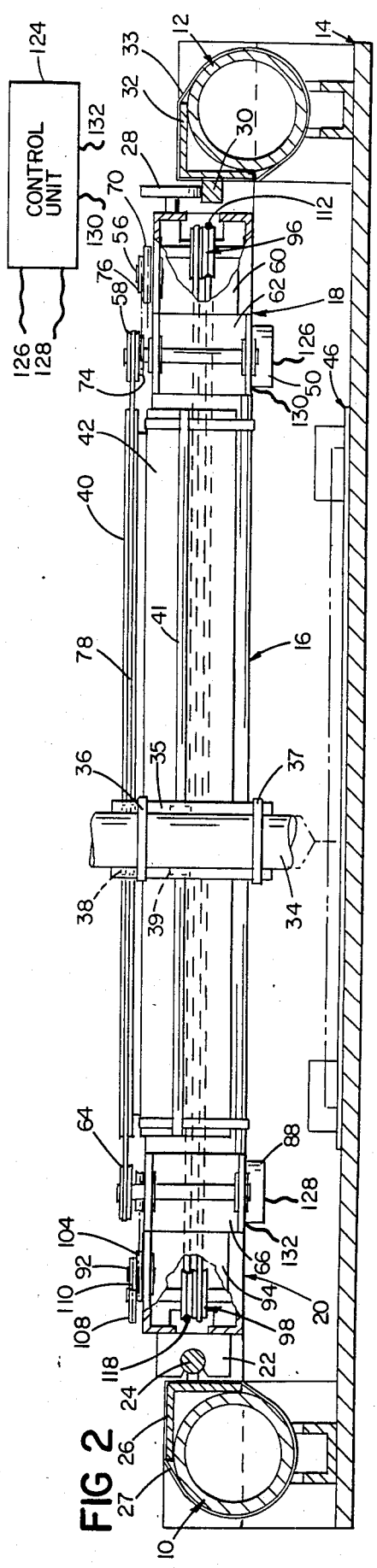

4,626,650

TWO-AXIS CUTTING MACHINE USING A PLASMA ARC TORCH OR THE LIKE

BACKGROUND OF THE INVENTION

This invention relates to cutting desired shapes from sheet metal or the like.

A sheet metal cutting machine typically has a cutting tool, e.g., a plasma torch that moves along the length of a beam. The beam itself moves along a pair of parallel rails which are at right angles to the beam, preferably under programmable computer control, to achieve complete two-axis control of the torch position.

In some machines the beam is driven along the rails by synchronizing two motors, attached to the beam, that respectively drive the ends of the beam along the rails at the same rate, and maintain the right-angle relationship between the beam and the rails. Other machines have one large motor mounted on one end of the beam that directly drives both ends of the beam along the rails at the same rate by means of a torque tube.

SUMMARY OF THE INVENTION

In general, the invention features a two-axis cutting machine for cutting a workpiece along a desired cutting path, having a frame for holding the workpiece, a rail fixed to the frame, a beam which is arranged to move along the rail and has a pair of driving points spaced apart along the axis of the beam, a cutting tool arranged to move along an axis of the beam, an elongated flexible drive means having portions engaged respectively at the two driving points, a carrier mechanism for carrying a drive section of the drive means, and for translating a force applied on the drive section into a pair of resulting forces directed parallel to the rail and applied respectively at the two driving points, and a beam drive motor mounted on the beam for exerting a force on the drive section, whereby the resulting forces move the beam along the rail, while maintaining a constant angle between the beam axis and the rail.

In preferred embodiments, the drive means has ends affixed to the frame, and the engaged portions of the drive means are not affixed to the two driving points; the drive means includes a pair of drive elements each affixed to the frame at a pair of attachment points, the carrier mechanism is arranged to translate a force applied on each drive element into a resulting force directed parallel to the rail and applied at one of the driving points, and the beam drive motor exerts forces simultaneously on both drive elements, such that the resulting forces are respectively applied at the two driving points, and are equal and have the same direction; the carrier mechanism includes a pair of pulleys mounted on the beam respectively at the two driving points, one flexible drive element passes clockwise around one of the pulleys, and counterclockwise around the other pulley, the other flexible drive element passes counterclockwise around the one pulley and clockwise around the other pulley, and each element is held taut between its two points of attachment to the frame; one of the pulleys is a drive wheel driven by the motor, the other pulley is an idler, and the drive wheel is responsive to activation of the motor to exert driving forces simultaneously on both drive elements; the cutting machine includes a cutting tool drive motor for driving the cutting tool along the beam, and the cutting tool drive motor is mounted on the beam in a fixed position; the beam drive and cutting tool drive motors are mounted in respective locations to balance the beam; there are a pair of parallel rails, and the beam is mounted between the rails on bearings which permit movement along the rails; the cutting machine also has a speed reduction apparatus (pulleys and belts) connected to the beam drive motor and to the drive wheel for producing a lower speed and a higher torque at the drive wheel than at the beam drive motor; the cutting tool is a plasma arc torch; and the cutting machine also includes control circuitry connected to the beam drive motor to deliver torque current to the beam drive motor in accordance with a desired position of the beam.

The lightweight beam and the simple drive arrangement permit rapid, accurate movement of the beam. The drive arrangement is simple and economical to construct and repair. The beam is well balanced and has a high resonance frequency.

Other advantages and features will be apparent from the following description of the preferred embodiment, and from the claims.

DESCRIPTION OF THE PREFERRED EMBODIMENT

We first briefly describe the drawings.

Drawings

FIG. 1 is a somewhat schematic plan view, partially broken away, partially in section, of a sheet metal cutting machine.

FIG. 2 is a side view, partially in section, taken along 2—2 of FIG. 1.

Structure

Referring to FIGS. 1 and 2, parallel tubular steel rails 10, 12 are mounted at their ends on a frame 14.

Tubular aluminum beam 16 extends between, and is movable along, rails 10, 12, with the axis of the beam at right angles to the rail. (The beam is 7 feet long and weighs approximately 50 lbs. The outside diameter measures 4" with a ¼" thick wall). Identical aluminum end caps 18, 20, each of rectangular cross-section, fit over tubular sleeves 21, which in turn fit into the opposite ends of beam 16.

Thompson bushing 22 is mounted on end cap 20 and rides on Thompson shaft 24, which in turn is mounted on rail 10 by brackets (one shown) 26 which are strapped to the rail by pipe clamps (one shown) 27 at intervals along the length of the rail.

Roller 28 is mounted on end cap 18 and rides on shelf 30, which in turn is mounted on rail 12 by brackets (one shown) 32 which are strapped to the rail by pipe clamps (one shown) 33 at intervals along the length of the rail.

Plasma arc torch 34 is secured to beam 16 by brackets 36, 37 which hold torch 34 on carrier 35 with the nozzle of the torch aimed downward. Carrier 35 holds Thompson bushings 38, 39 which run along Thompson shafts 40, 41. Thompson shafts 40, 41 are affixed to angle support 42 which, in turn, is strapped to beam 16 by steel strips (one shown) 43 located at intervals along the beam's length.

Frame 14 supports work table 46 between rails 10, 12 and beneath beam 16.

L-shaped bracket 52 holds lightweight bidirectional DC servo torch motor 50 on end cap 18, with the motor's output shaft 54 perpendicular to the surface of work table 46.

Dual pulleys 56, 58 are attached to the other side of end cap 18 respectively by u-shaped brackets 60, 62. Idler pulley 64 is attached to one side of end cap 20 by u-shaped bracket 66 (identical to brackets 60, 62). Rubber timing belt 68 runs between output shaft 54 and large diameter portion 70 of pulley 56, and rubber timing belt 72 runs between large diameter portion 74 of pulley 58 and small diameter portion 76 of pulley 56 thereby stepping down the rotational speed of torch motor 50 by a ratio of 10:1.

Flexible stainless steel drive cable 78 loops around both dual pulley 58 and idler pulley 64. One leg 80 of the loop attaches to carrier 35, the other leg 82 of the loop is free to move with respect to the carrier. Thus, as the torch motor 50 rotates, the torch 34 moves along the Thompson shafts 40, 41 of the beam 16 assembly.

L-shaped bracket 86 (identical to bracket 52) holds lightweight bidirectional DC servo beam motor 88 (identical to torch motor 50) to end cap 20, with the motor's output shaft 90 perpendicular to the surface of work table 46. Beam motor 88 and torch motor 50 mount at equal distances from the respective ends of beam 16, providing a balanced system.

Dual pulley 92 is secured to the other side of end cap 20 by u-shaped bracket 94 (dual pulleys 56, 92 are symmetrically positioned to output shafts 54, 90 of the torch and beam motors 50, 88). Precision centerless ground pulleys 96, 98 respectively are held inside end caps 18, 20.

Rubber timing belt 102 runs between output shaft 90 and large diameter portion 104 of pulley 92, and rubber timing belt 106 runs between large diameter portion 108 of pulley 98 and small diameter portion 110 of pulley 92, thereby stepping down the rotational speed of beam motor 88 by a ratio of 10:1.

Flexible stainless steel drive cable 112 is fixed at one end 114 of frame 14, extends parallel to rail 10, passes counterclockwise around and is carried by centerless ground pulley 98, extends diagonally within beam 16, passes clockwise around and is carried by centerless ground pulley 96, continues parallel to rail 12, and is fixed on the other end (not shown) of frame 14.

Flexible stainless steel drive cable 118 is fixed at one end 120 of frame 14, extends parallel to rail 12, passes clockwise around and is carried by centerless ground pulley 96, extends diagonally within beam 16, passes counterclockwise around and is carried by centerless ground pulley 98, continues parallel to rail 10, and is fixed on the other end (not shown) of frame 14.

The torch and beam motors 50, 88 are connected to a programmable control unit 124 via wires 126, 128. Position sensors (not shown) are mounted on the shafts of motors 50, 88 and are connected to the same control unit 124 via wires 130, 132.

A trough (not shown) mounts on the side of beam 16 as a cable festoon for the cables leading to torch 34.

Operation

In order to cut a particular shape out of sheet metal, programmable control unit 124 issues appropriate torque currents to the torch and beam motors 50, 88 via wires 126, 128. Position sensors monitor the motor rotations and send electrical messages back to control unit 124 via wires 130, 132 (the wires thus implement a positive feedback loop in which the control unit 124 verifies the shaft angle locations of the torch and beam motors 50, 88). Control unit 124 directs the torch 34 in either direction along beam 16, as desired, and also directs beam 16 in either direction along rails 10, 12, these movements (at speeds up to 3,000 in./min.) being simultaneous or not, depending on the shape to be cut by the torch 34.

Programmable control unit 124 drives lightweight torch motor 50 via control wire 126. If torch motor 50 rotates counterclockwise, it engages idler pulley 56 via timing belt 68. Idler pulley 56 engages precision pulley 58 via timing belt 72. Precision pulley 58 engages precision pulley 64 via drive cable 78, thereby moving torch assembly 34 along beam 16. Reversing the direction of the motor 50 reverses the direction of torch 34 movement along beam 16.

The same control unit 124 drives beam motor 88 via control wire 128. For example, when a torque current is sent to motor 88 to cause it to turn counterclockwise, the belts and pulleys in turn cause counterclockwise turning of pulley 98 at a slower speed. Pulley 98 then simultaneously applies identical forces, one on cable 112 attempting to pull it from the point 114 (where it is fixed on the frame) toward pulley 98, the other on cable 118 attempting to pull it from pulley 96 toward pulley 98. Since cable 118 passes around pulley 96, the force on cable 118 attempts to pull it from point 120 (where it is fixed on the frame) toward pulley 96. Since neither of the cables 112, 118 can be pulled from its fixed point, the effect is to produce two equal reaction forces on pulleys 96, 98, both forces being directed parallel to rails 10, 12. The result is that beam 16 is driven smoothly along the rails, with the axis of the beam constantly maintained at a right angle to the rails.

Conversely, rotating beam motor 88 counterclockwise results in beam 16 moving in the opposite direction.

Thus, a single lightweight motor mounted on one side of the beam in conjunction with a symmetrical pulley arrangement, including reliable stainless steel cables, drives both ends of the beam with equal forces, ensuring beam parallelism.

The location of driving means for both beam and torch movement on the symmetrical end caps allows design flexibility as the beam length may be scaled up or down.

The torch and beam motors and the pulley system are lightweight and balanced. The use of lightweight parts precludes the need for a gearbox, thus eliminating backlash and reducing friction, mass and cost. The low beam mass enables good start and stop performance. Further, the reduced mass raises the resonant frequency of the beam ensuring precise cutting.

Mounting the torch motor on the end of beam, along with separately festooning the cables for the motors and the torch, reduces electrical interference.

Other embodiments are within the following claims.

What is claimed is:

1. A two-axis cutting machine for cutting a workpiece along a desired cutting path comprising:
   a frame for holding the workpiece,
   a rail fixed to the frame,
   a beam arranged to move along the rail and having a pair of driving points spaced apart along an axis of the beam,
   a cutting tool arranged to move along an axis of the beam,
   an elongated flexible drive means having portions engaged respectively at the two driving points,
   a carrier mechanism for carrying a drive section of the drive means, and having a pair of force translating elements at the two driving points for translating a force applied on the drive section into a pair of resulting forces directed parallel to the rail and in the same direction and applied respectively at the two driving points, and a beam drive motor mounted on the beam for driving via means other than said flexible driving means, one of said force translating elements to cause it to exert a force on the drive section at one of said driving points, whereby the resulting forces at the two driving points move the beam along the rail while maintaining a constant angle between the beam axis and the rail.

2. The cutting machine of claim 1 wherein the drive means has ends affixed to the frame, and the engaged portions of the drive means are not affixed to the two driving points.

3. The cutting machine of claim 1 wherein the elongated flexible drive means comprises a pair of drive elements each affixed to the frame at a pair of attachment points, the carrier mechanism is arranged to translate a force applied on each drive element into a resulting force directed parallel to the rail and applied at one of the driving points, and the beam drive motor exerts forces simultaneously on both drive elements, such that the resulting forces are respectively applied at the two driving points, and are equal and have the same direction.

4. The cutting machine of claim 3 wherein the carrier mechanism comprises a pair of pulleys mounted on the beam respectively at the two driving points, one flexible drive element passes clockwise around one of the pulleys, and counterclockwise around the other pulley, the other flexible drive element passes counterclockwise around the one pulley and clockwise around the other pulley, and each element is held taut between its two points of attachment to the frame.

5. The cutting machine of claim 4 wherein one of the pulleys is a drive wheel driven by the motor, the other pulley is an idler, and the drive wheel is responsive to activation of the motor to exert driving forces simultaneously on both drive elements.

6. The cutting machine of claim 1 further comprising a cutting tool drive motor for driving the cutting tool along the beam, and wherein the cutting tool drive motor is mounted on the beam in a fixed position.

7. The cutting machine of claim 6 wherein the beam drive and cutting tool drive motors are mounted in respective locations to balance the beam.

8. The cutting machine of claim 1 wherein there are a pair of parallel rails, and the beam is mounted between the rails on bearings which permit movement along the rails.

9. The cutting machine of claim 5 further comprising a speed reduction apparatus connected to the beam drive motor and to the drive wheel for producing a lower speed and a higher torque at the drive wheel than at the beam drive motor.

10. The cutting machine of claim 9 wherein the speed reduction apparatus comprises pulleys and belts.

11. The cutting machine of claim 1 wherein the drive means comprises taut cables.

12. The cutting machine of claim 1 wherein the cutting tool is a plasma arc torch.

13. The cutting machine of claim 1 further comprising control circuitry connected to the beam drive motor to deliver torque current to the beam drive motor in accordance with a desired position of the beam.

14. A two-axis cutting machine for cutting a workpiece along a desired cutting path comprising:
a frame for holding the workpiece,
a pair of parallel rails fixed to the frame,
a beam arranged to move along the rails and having a pair of driving points at opposite ends of the beam,
a cutting tool arranged to move along the beam,
a pair of taut drive cables each affixed to the frame at a pair of attachment points,
a pair of pulleys mounted on the beam respectively at the driving points with one cable being threaded from one of its points of attachment at the frame, then clockwise around one pulley, then counterclockwise around the other pulley, and then to the other point of attachment, and the other cable being threaded from one of its points of attachment at the frame, then counterclockwise around the one pulley, then clockwise around the other pulley, and then to the other point of attachment, and
a beam drive motor mounted on the beam and connected to drive via means other than said taut cables, one of the pulleys for exerting simultaneous driving forces on both cables,
whereby the driving forces are translated by the pulleys into two equal forces directed parallel to the rails and in the same direction and applied respectively at the two driving points to move the beam along the rails, while maintaining a constant angle between the beam axis and the rails.

* * * * *